(12) United States Patent
Dias

(10) Patent No.: US 10,039,344 B2
(45) Date of Patent: Aug. 7, 2018

(54) SOLE

(71) Applicant: Olga Dias, Castle Pines, CO (US)

(72) Inventor: Olga Dias, Castle Pines, CO (US)

( * ) Notice: Subject to any disclaimer, the term of this patent is extended or adjusted under 35 U.S.C. 154(b) by 233 days.

(21) Appl. No.: 14/775,012

(22) PCT Filed: Mar. 14, 2014

(86) PCT No.: PCT/GB2014/000096
§ 371 (c)(1),
(2) Date: Sep. 11, 2015

(87) PCT Pub. No.: WO2014/140516
PCT Pub. Date: Sep. 18, 2014

(65) Prior Publication Data
US 2016/0029739 A1    Feb. 4, 2016

(30) Foreign Application Priority Data

Mar. 15, 2013   (GB) .................................. 1304681.8

(51) Int. Cl.
| | | |
|---|---|---|
| *A43B 13/18* | (2006.01) |
| *A43B 1/02* | (2006.01) |
| *A43B 3/24* | (2006.01) |
| *A43B 5/18* | (2006.01) |
| *A43B 13/22* | (2006.01) |
| *A43B 13/02* | (2006.01) |
| *A43B 13/36* | (2006.01) |
| *A01G 2/00* | (2018.01) |

(52) U.S. Cl.
CPC .............. *A43B 13/187* (2013.01); *A01G 2/00* (2018.02); *A43B 1/02* (2013.01); *A43B 3/246* (2013.01); *A43B 5/18* (2013.01); *A43B 13/02* (2013.01); *A43B 13/22* (2013.01); *A43B 13/36* (2013.01)

(58) Field of Classification Search
CPC ........... A43B 3/16; A43B 3/163; A43B 3/244; A43B 3/246; A43B 3/0084; A43B 1/02; A01G 1/002; A01G 1/004; A01G 1/005
See application file for complete search history.

(56) References Cited

U.S. PATENT DOCUMENTS

| | | | |
|---|---|---|---|
| 2,400,487 A | | 2/1942 | Clark |
| 4,007,549 A | * | 2/1977 | Moore ..................... A43B 5/10 36/129 |
| 4,356,643 A | * | 11/1982 | Kester .................... A43B 13/22 36/59 C |

(Continued)

FOREIGN PATENT DOCUMENTS

| | | |
|---|---|---|
| CN | 2 896 945 | 5/2007 |
| CN | 202222508 U | 5/2012 |

(Continued)

*Primary Examiner* — Megan Lynch
(74) *Attorney, Agent, or Firm* — William H. Bollman

(57) ABSTRACT

A sole (100, 300) for use on an item of footwear (200) wherein the sole (100,300) provides a housing for a growth medium (40) capable of growing and maintaining grass (45). The sole (100, 300) is arranged to be fitted to a lower face of an item of footwear (200), the sole is adapted to retain a growth medium (40) suitable for growing grass (45), so that when fitted to the item of footwear (200), blades of grass project distally from the sole through a mesh (30). The user therefore has the sensation of walking on grass even if not on a grassy surface.

18 Claims, 13 Drawing Sheets

(56) References Cited

U.S. PATENT DOCUMENTS

| | | | | |
|---|---|---|---|---|
| 4,434,565 A * | 3/1984 | Haley | A43B 3/16 | 36/59 R |
| 7,203,985 B2 * | 4/2007 | Cox | A43B 1/0027 | 12/146 B |
| 7,836,610 B2 | 11/2010 | Laporte | | |
| 2003/0014881 A1 * | 1/2003 | Hay | A43B 7/141 | 36/25 R |
| 2004/0006890 A1 * | 1/2004 | Otis | A43B 3/0078 | 36/9 R |
| 2004/0088883 A1 * | 5/2004 | Workman | A43B 3/18 | 36/15 |
| 2004/0088889 A1 * | 5/2004 | Kelley | A43B 3/108 | 36/136 |
| 2004/0148803 A1 * | 8/2004 | Grove | A43B 13/223 | 36/103 |
| 2004/0163284 A1 * | 8/2004 | Daniels | A43B 3/0084 | 36/103 |
| 2005/0005471 A1 * | 1/2005 | Pan | A43B 1/00 | 36/9 R |
| 2005/0268491 A1 * | 12/2005 | McDonald | A43B 1/0063 | 36/28 |
| 2006/0042119 A1 * | 3/2006 | Workman | A43B 5/08 | 36/15 |
| 2007/0017124 A1 * | 1/2007 | Koo | A43B 13/02 | 36/59 R |
| 2009/0049711 A1 | 2/2009 | Finch | | |
| 2009/0090031 A1 * | 4/2009 | Jung | A43B 13/14 | 36/59 C |
| 2009/0126230 A1 * | 5/2009 | McDonald | A43B 1/0063 | 36/88 |
| 2010/0242199 A1 * | 9/2010 | Hogan | A43B 1/0081 | 15/227 |
| 2010/0242305 A1 * | 9/2010 | Liu | A43B 3/128 | 36/102 |
| 2012/0117817 A1 * | 5/2012 | Chamberlin | A43B 1/0081 | 36/15 |
| 2012/0227289 A1 * | 9/2012 | Beers | A43B 3/128 | 36/25 R |

FOREIGN PATENT DOCUMENTS

| | | |
|---|---|---|
| CN | 102860619 A | 1/2013 |
| EP | 1 581 068 | 10/2005 |
| KR | 2009 0101807 | 9/2009 |
| KR | 101062695 B1 | 8/2011 |

* cited by examiner

SOLE

FIELD OF THE INVENTION

The present invention relates to an item of footwear, more particularly but not exclusively a sole for attachment to a base of a shoe having grass arranged to interface with the ground.

BACKGROUND

Distance walking, jogging, running and playing sports are daily activities for most people and for some for a regular part of an exercise programme. When regularly partaking in such activities it is important that suitable footwear is worn in order to protect and support a user's feet.

Generally walking, running or playing sports on soft ground, and in particular grass, is recommended as the natural cushioning provided by the grass reduces impact forces as the foot hits the ground and therefore reduces jarring of user's body. Said cushioning is natural to a user's body in acceptance, transference and dispersal of forces.

However access to grassy areas is not readily available for all and therefore many people continue to walk and run or exercise on hard surfaces.

PRIOR ART

Accordingly a number of patent applications have been filed in an attempt to resolve the problem or similar, including the following:

United States patent application US 2009 049 711 (Finch) discloses an overshoe for running, comprising a unitary body formed from a resilient material, the unitary body having: a sole having opposed upper and lower surfaces and defining a periphery; a peripheral wall extending upwardly from the periphery of the upper surface of the sole, the peripheral wall and the sole defining an open interior region adapted for receiving a shoe; and means for securing the unitary body to the shoe; whereby the unitary body is selectively and removably attached to the shoe in order to provide additional padding and shock absorption therefor.

Granted U.S. Pat. No. 7,836,610 (Laporte) discloses an attachment for an item of footwear having an outsole, the attachment comprising: a body having first and second body surfaces, the body being releasably co-operable with the outsole in a first position in which the first body surface is disposable away from the outsole and in a second position in which the second body surface is disposable away from the outsole.

Granted European patent EP 1 581 068 (Smaldone et al) discloses an article of footwear having an upper for receiving a foot of a wearer and a sole structure attached to said upper, said sole structure comprising: a discrete, vertically-projecting, columnar element positioned between upper and lower surfaces of a cavity formed within said sole structure and having a substantially vertical void located on an interior of said columnar element, and said cavity extending through a lateral side and a medial side of said footwear to form a horizontal opening in said sole structure.

Granted U.S. Pat. No. 4,007,549 (Moore) discloses an improved shoe for an athletic shoe comprising artificial turf material.

Granted U.S. Pat. No. 4,356,643 (Kester et al) discloses a non slip footwear having an underside of the sole covered by a friction pad.

Granted U.S. Pat. No. 2,400,487 (Clark) discloses a composite sheet of material for shoe soles.

United States Patent Application US 2010/0242305 A1 (Lui) discloses a therapeutic cushioned sole having a base that carries a cushioning material capable of simulating the feeling of walking on grass.

Chinese Utility Model CN202222508U (Chen) discloses a shoe having a sole, a shoe body, Velcro and bristles.

Granted Korean Patent KR101062695B1 (Jin et al) discloses a piece of footwear that enables a user to achieve the feeling and cushioning associate with walking on grass having artificial turf arranged on an outsole.

Chinese Patent Application CN102860619A (Majiawei) discloses a multifunctional flip-flop with bristles for cleaning, arranged on the bottom of the sole.

The present invention discloses a sole for use on footwear that is capable of holding real grass in arrangement so that the grass interfaces the ground in use.

SUMMARY OF THE INVENTION

According to the present invention there is provided a sole arranged to be fitted to a lower face of an item of footwear, the sole is adapted to retain a growth medium suitable for growing grass, so that when fitted to the item of footwear, blades of grass project from the sole through a mesh.

In this way a user wearing a shoe with the aforementioned sole a layer of grass is presented between the wearer's foot and the ground. The sensation therefore experienced by the wearer is that of walking on grass even if the ground is not grassy.

Different types of sole may be configured to provide the user with the sensation of walking, running or exercising on grass whatever the actual terrain. The sole also has the benefit of providing cushioning for the foot in the same way as by being on a grassed surface.

The sole reduces jarring associated with walking or running on hard ground, such as roads or some indoor sports venues, so reducing the likelihood of associated injuries in particular, knee, leg and hip injuries.

The sole may be fitted to or integrated with any footwear type, for example: a shoe, sports shoe, training shoe, sandal, flip-flop, plimsoll or pump.

Ideally the sole defines a housing provided for the growth medium. The growth medium is capable of allowing grass to grow and maintain the grass, so that the sole includes a layer of grass across a surface of the sole that interfaces the ground.

In some embodiments the sole comprises a mesh having a continuous wall arranged around an edge of the mesh so as to define a cavity for receiving and retaining growth medium and grass. Advantageously the sole can be retrofitted to a piece of footwear wherein the attachment means serves to hold grass and growth medium held in the cavity, defined in the sole, to a lower face of the footwear. In this way a layer of grass can be positioned on the lower face of any item of footwear and the sole can be arranged over the layer of grass and secured using the attachment means. Advantageously therefore these features allow any shoe to be fitted with a layer of grass.

Preferably the layer of grass is of sufficient thickness to act as a shock absorber so as to reduce impact to the user's joints. Typically the layer of grass is at least 5 mm and preferably at least 10 mm thick. The growth medium may also serve to provide shock absorbing properties and may be considered as part of the layer of grass.

Preferably the mesh is shaped to match the lower face of the footwear that interfaces with the ground in order to allow the grass layer arranged in the sole to project through the mesh apertures and extend distally in use. Ideally the sole is dimensioned to the shape of the footwear in order to cup the lower face of the shoe.

Typically the sole includes a toe clip and a heel clip so as to be able to easily fit the sole to the footwear.

Ideally the sole is formed from an elastic material such as rubber or silicone in order to allow the toe clip and heel clip to be stretched over and secured tightly to the shoe.

Additionally or alternatively in some embodiments the wall may include a lip that narrows the cavity opening. The lip may aid in securing the growth medium and grass within the cavity in addition to the presence of the mesh. Furthermore the lip may also aid in securing the sole to the footwear by providing a tight opening which is less likely to be displaced from the footwear in use.

In another embodiment the sole includes a base for attaching to a lower face of the footwear from which the continuous wall extends distally to define the cavity for retaining the growth medium wherein the mesh is adapted to correspond to the cavity opening in order to retain the growth medium within the cavity.

In this way the base and wall define the cavity for holding the grass and growth medium.

Additionally the sole may be permanently fitted to or integrated with an item of footwear wherein the base is fixed to the footwear. For example the base may be fixed to the lower face of the shoe by being glued with adhesive, by ultrasonic welding or by heat bonding.

In preferred embodiments the cavity is enclosed by the mesh. Advantageously the mesh is displaceable so as to enable access to the growth medium and grass. The mesh serves to secure the growth medium within the sole and allows blades of grass to project through the mesh from the growth medium so as to be external of the sole and therefore being capable of interfacing the ground.

Typically the mesh is sized to cover the cavity.

In some embodiments the mesh may be arranged in a frame that is capable of fitting to or over the cavity opening.

The mesh may be fitted by means of a detent mechanism, by a friction fitting; or by clips, buckles, hook and loop means; or by interlocking portions, a twist mechanism or magnets. It is understood that the mesh can be fixed to the base and wall in order to close the cavity and secure the growing medium within the sole.

The wall has a distal end which the mesh edge may be shaped to engage in such a way that the mesh is fixed in the sole during use. For example the mesh may be flexed to fit within the lip and/or curvature of the wall and then released so that the wall's distal end and the mesh edge engage.

In some embodiments part of the mesh may be permanently fixed to the wall and/or base, for example by means of a hinge, so as to allow the mesh to be displaced without completely detaching the mesh from the sole. In this way the mesh is easily fitted to and removed from the cavity without becoming detached or lost and without having to spend time aligning the mesh to fit the cavity.

Ideally the mesh is designed to cover the entire cavity opening so as to allow grass blades to project from the entire cavity opening in order to cover the part of the sole that interfaces the ground.

Ideally the sole is shaped to match the shape of a shoe footprint, so that the sole covers all parts of the shoe that interfaces the ground. In this way any part of the shoe that may touch the ground when worn, is covered by the sole and therefore is capable of supporting a layer of grass.

Typically a base portion of the sole is substantially planar and has a top surface and a bottom surface wherein the top surface is received by a lower face of the shoe.

The bottom surface includes a wall that projects substantially perpendicular from an outer edge. In use the wall is arranged to project distally from the base towards the ground.

Preferably the wall is continuous about the entire edge of the base so as to define the cavity for receiving growth medium.

Ideally the base and wall are formed from a resiliently deformable material so as to be capable of flexing when worn, thereby allowing the sole to deform as a user bears weight on the sole. Furthermore having a resiliently deformable base and wall enables the sole to function as a shock absorber by reducing impact on the user.

In some preferred embodiments the base and wall may be integrated, for example being formed from the same material or being formed from a continuous piece of material. For example the base and wall may be moulded from a synthetic plastics material or rubber, such as forming by injection moulding.

In other embodiments the wall may be adhered to the base portion, for example by being glued with adhesive, by ultrasonic welding or by heat bonding.

The height and/or thickness of the wall of any embodiment of the sole may be varied in order to alter cavity size so that the amount of grass and growth medium within the cavity can be altered. For example different cavity depths may be provided to alter shock absorbency properties of the shoe by having more or less grass and/or growth medium.

In some embodiments the cavity may be divided into sections by internal walls or ribs, for example so as to define a toe and a heel section. Advantageously the internal walls may serve to provide additional strength to the sole as well as define separate cavities for holding growth medium and grass.

In some embodiments the wall may be curved, so as to have a concave form on an inner face of the wall that defines the cavity. In this way the growth medium and grass are less likely to be displaced from the sole during use. Furthermore this allows the wall to flex easily during weight bearing as the wall folds under the user's weight.

Ideally the sole is made from a flexible material such as synthetic plastics, for example polypropylene or a rubber type material such as silicone which are lightweight, strong and durable. Advantageously this allows the sole to bend and fold during use.

It may be envisaged that some parts of the sole may be strengthened and/or re-enforced to maintain shape of sole and to provide support to the foot. For example the wall may be designed so as to allow vertical compression when weight bearing but to prevent or limit collapse to the right or to the left which may compromise user's foot balance or lead to injury.

Additionally or alternatively in some embodiments the walls may include a lip that narrows the cavity opening. The lip may aid in securing the growth medium and grass within the cavity in addition to the presence of the mesh.

The mesh for any sole described above is typically a layer of material having a plurality of apertures through which one or more blades of grass can pass. The aperture size may be variable dependant on blade size. For example aperture size may correspond to grass species in order to ensure the apertures are sufficient to allow the blade to pass through.

In some embodiments the mesh may have apertures for receiving a plurality of blades so that a tuft of grass may project through one aperture. Advantageously this may allow for increased density of grass and reduce the number of blades that may rub against the mesh which might otherwise become more quickly damaged. Therefore having tufts of grass may prolong longevity of the grass in the sole.

Preferably the mesh is displaceable so as to enable access to the cavity to allow addition and removal of the growth medium. Advantageously this also allows the mesh to be cleaned after use and exchanged if worn or damaged.

In some embodiments the toe clips or heel clips may be adjustable so as to allow them to be tightened about the shoe. For example the clips may include a toggle or a buckle to allow tightening.

The growth medium in the cavity helps to provide a location and support means for growing live grass. The growth medium ideally supports a root system so that the grass is live. Advantageously the growth medium is impregnated with grass seeds.

The growth medium may include one or more of the following: soil, plant seeds, additives/nutrients and a means for retaining moisture to encourage and maintain the grass.

Alternatively a non-soil based growth medium may be such as those used in hydroponic growth mediums for example Perlite® or CoCo Coir®.

The grass may be either grown within the sole or grown remotely and then transplanted into the sole prior to use.

In some embodiments the growth medium is seeded and the mesh is arranged relative to the seeded medium so that the grass grows through mesh. This particular arrangement may be preferred when using a mesh having a plurality of small closely arranged apertures because it may be difficult to force already grown grass through such apertures, without causing damage to the grass.

Advantageously dead or damaged grass may be removed and replaced by emptying the cavity containing grass and growth medium and inserting a new growth medium impregnated with grass. Therefore the sole is reusable.

Templates that correspond to particular soles may be provided for growing grass in growth medium remotely from the sole. In this way replacement grass can be cultivated so that it may be replaced when the grass in a sole is depleted, for example when grass becomes depleted or worn.

Typically a hard wearing grass is grown within the sole so as to be more resilient to damage whilst interfacing the ground under the weight of a user. In some embodiments more than one species of grass may be used.

For example the species may include but are not limited to rye grass, meadow grass or fescue grass.

In some embodiments a genetically modified grass may be used. For example the grass may be genetically modified to select properties for being hard wearing, and/or for accelerated growth so as to allow replacement layers of grass to be grown quickly.

Soles may be provided in different dimensions in order to correspond to different types and size of footwear.

The attachment means, for attaching the sole to item of footwear may include, but are not limited to: clips, bands, buttons, push fittings, magnets, buckles or hook and loop means.

In preferred embodiments the attachment means may comprise a toe clip and/or a heel clip which serve to secure a front portion and a rear portion of the sole to the shoe. In this way the sole is securely fixed to the sole so as to remain in place during use.

Typically the toe clip and heel clip may extend about or over parts of the shoe in order to prevent displacement during use. For example the toe clip may comprise a band which passes over the toe or a hook that hooks on over the toe by means of an aperture, loop or bar.

The heel clip may extend across the shoe back in order to cup the heel region.

In alternative embodiments the sole may have an elasticated periphery extending from the wall for arrangement about the footwear. For example the elastic periphery may extend from the wall of the sole.

In some embodiments the grass may be interspersed with artificial projections so as to provide improved support to surrounding real grass. Ideally the artificial projections are resiliently deformable and capable of independent multi-axial motion.

Ideally each projection is flexible so as to deform when in contact with the ground acting as independent shock absorbers similar to real grass blades. Advantageously the plurality of flexible projections enable dynamic randomisation of movement so that as the user's foot comes into contact with the ground the projections are deformable, thereby absorbing some of the impact force and are actively or dynamically adaptable to ground terrain, for example deforming around pebbles.

For example the artificial projections may be arranged in the growth medium and/or on a distal face of the base. Advantageously this may improve the longevity of the grass as well as providing enhanced grip for the user helping to prevent slipping.

In some embodiments the artificial projections may comprise artificial grass such as Astroturf® in order to give the appearance of real grass and therefore not detracting from the novel appearance of the grassy sole.

In other embodiments projections may comprise springs that extend from the base in a downward orientation in use so as to maintain the projections in a downwards orientation and in particular to allow the projection to become straight again after being trodden on. For example the spring and projections deform when in contact with the ground, the spring then rebounds when not in touch with the ground straightening any nearby or associated projections. It may be envisaged that grass may pass through the springs therefore disguising the springs.

In some embodiments the projections and/or springs may be evenly spaced across the sole.

In other embodiments the projections may be irregularly spaced, for example to correspond with areas that have increased wear such as the ball of the user's foot and the user's heel.

In different embodiments the orientation of each projection may be varied, therefore although being substantially downward facing the projections may be angled to a slight degree, for example between 0 and 60 degrees wherein 0 degrees is defined as perpendicular to the base. In this way the projections more closely represent the surrounding real grass.

Importantly, variation in the orientation of the projections prevents there being a bias in a particular direction which may lead to a gait abnormality for the user and/or affect foot balance, whilst walking or running wherein a bias may cause a repeated slip when contacting the ground, or increased deformation of the projections in a particular area or direction. For example if the projections under the user's foot outer edge were all in one direction this may lead to exacerbated pronation of the feet during use of the shoes whereas variation of the orientations is liable to limit this.

Additionally it may be possible arrange the orientations of the projections in order to treat an injury or gait abnormality.

It may be envisaged that soles may be provided to correspond with a person's gait or particular sport. For example the arrangement of internal walls may be structured to define cavities that correspond to parts of the shoe that bare most weight or require improved grip.

Alternatively or additionally the sole may be adapted to aid with foot balance, for example having more grass on one side of the sole in order to aid in correction of over or under pronation. This may be facilitated by altering cavity depth wherein the depth may vary across the sole.

In some embodiments the sole may include additional attributes in the base such as raised and lowered portions on a top face of the base. In this way the user's foot is massaged in use and may be less prone to localised damage or discomfort.

In some embodiments the sole may include grip portions to prevent or limit slipping, for example in muddy or icy conditions and to limit wear to the artificial grass by providing a harder wearing material that connects with the ground in use. For example said grips may be formed from rubber or carbon rubber and may typically be interspersed between the grass so as to provide an even tread over the sole.

Preferably the grips are of lesser lengths than the grass and any projections so as not to detract from the attributes of the grass.

In some embodiments, the grip portions may be integrated with the base. Optionally the grip portions may comprise removable studs which can be added as and when required to the sole.

Preferably the projection length is no greater than 20 mm so as to limit movement as the shoe contacts the ground, as longer length projections may cause shearing forces as the shoe touches the ground and the user's body weight shifts over the foot whilst weight bearing, which could lead to injury.

Optionally the sole may be transparent or translucent or include such sections so as to enable light to reach the seedlings as they grow. This may enhance cultivation of the grass.

DETAILED DESCRIPTION OF FIGURES

Figure 1:
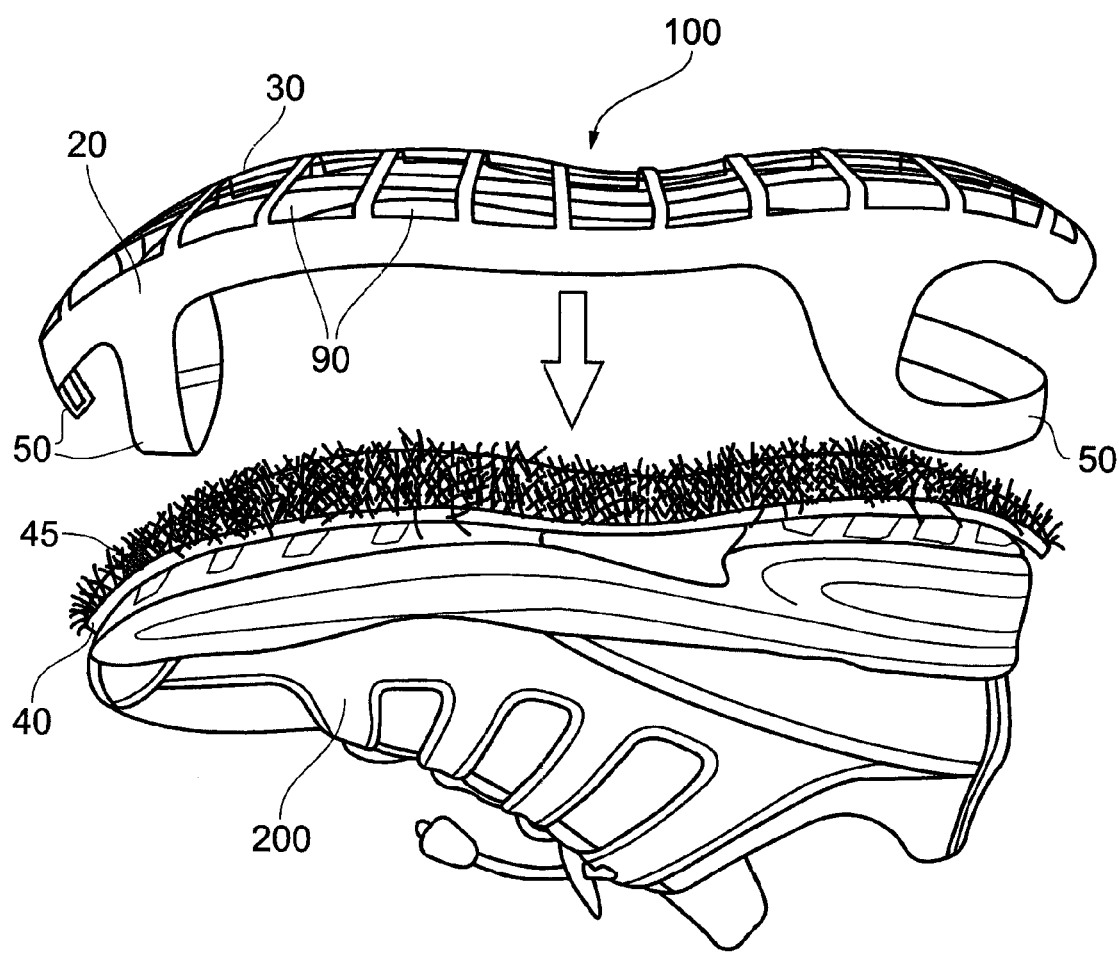
FIG. 1 shows an exploded view of a first embodiment of the sole.
Figure 2:
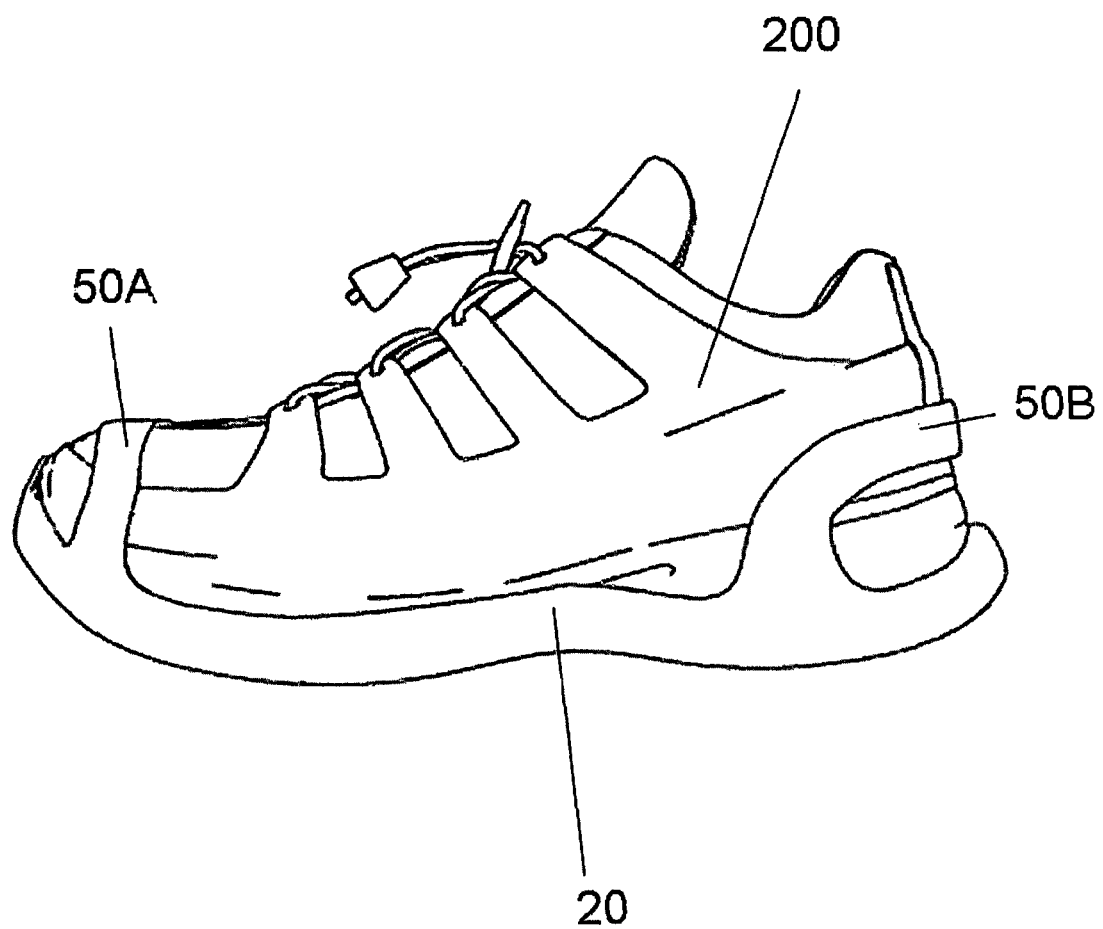
FIG. 2 shows a side view of the sole of FIG. 1 fitted to a training shoe.
Figure 3:
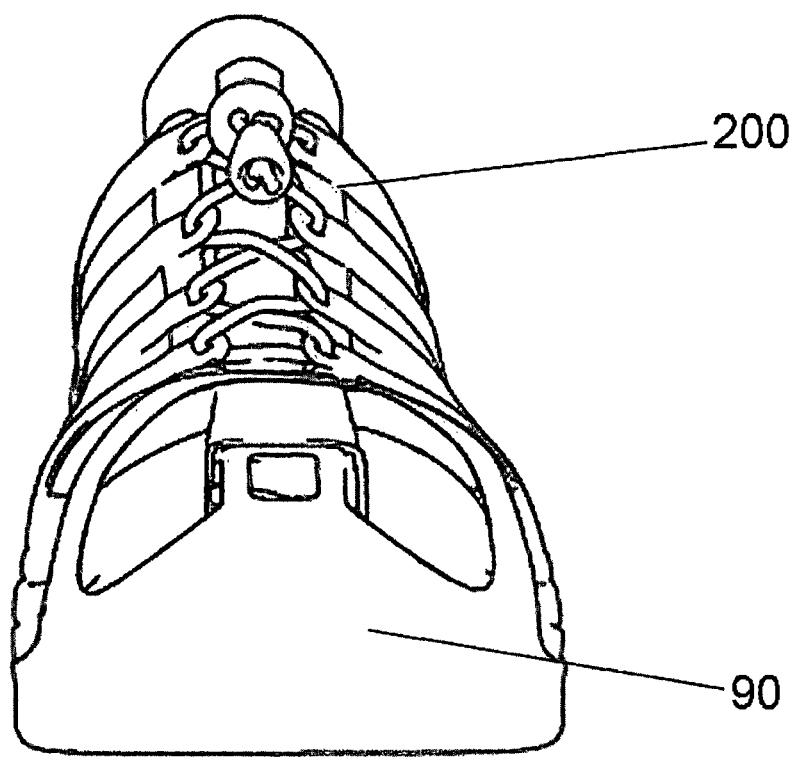
FIG. 3 shows a front view of the sole shown in FIG. 1.
Figure 4:
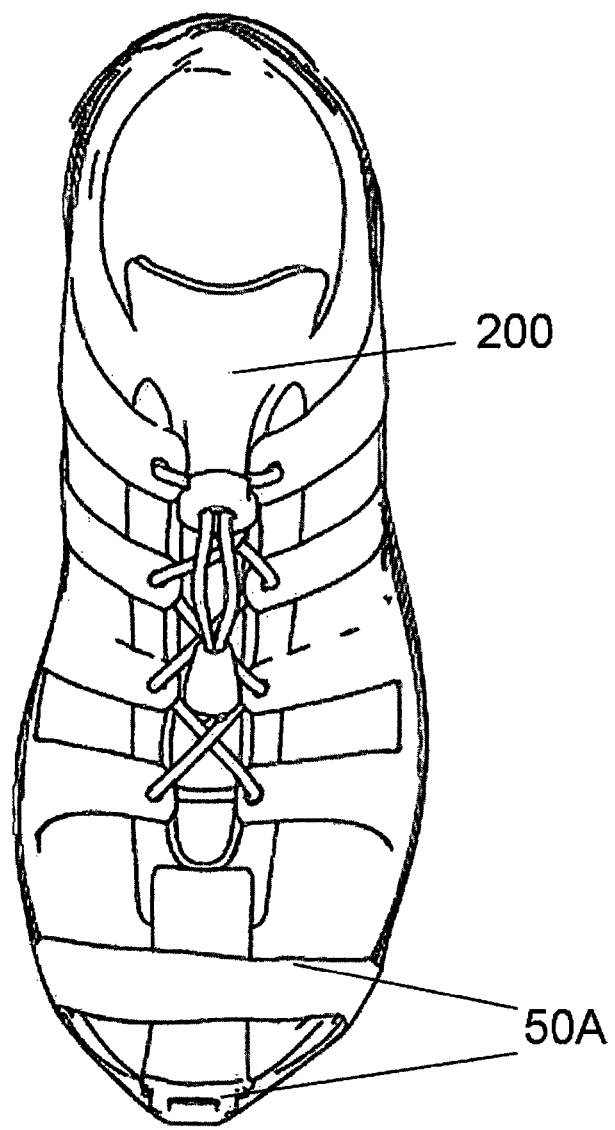
FIG. 4 shows a top view of the sole shown in FIG. 1.
Figure 5:
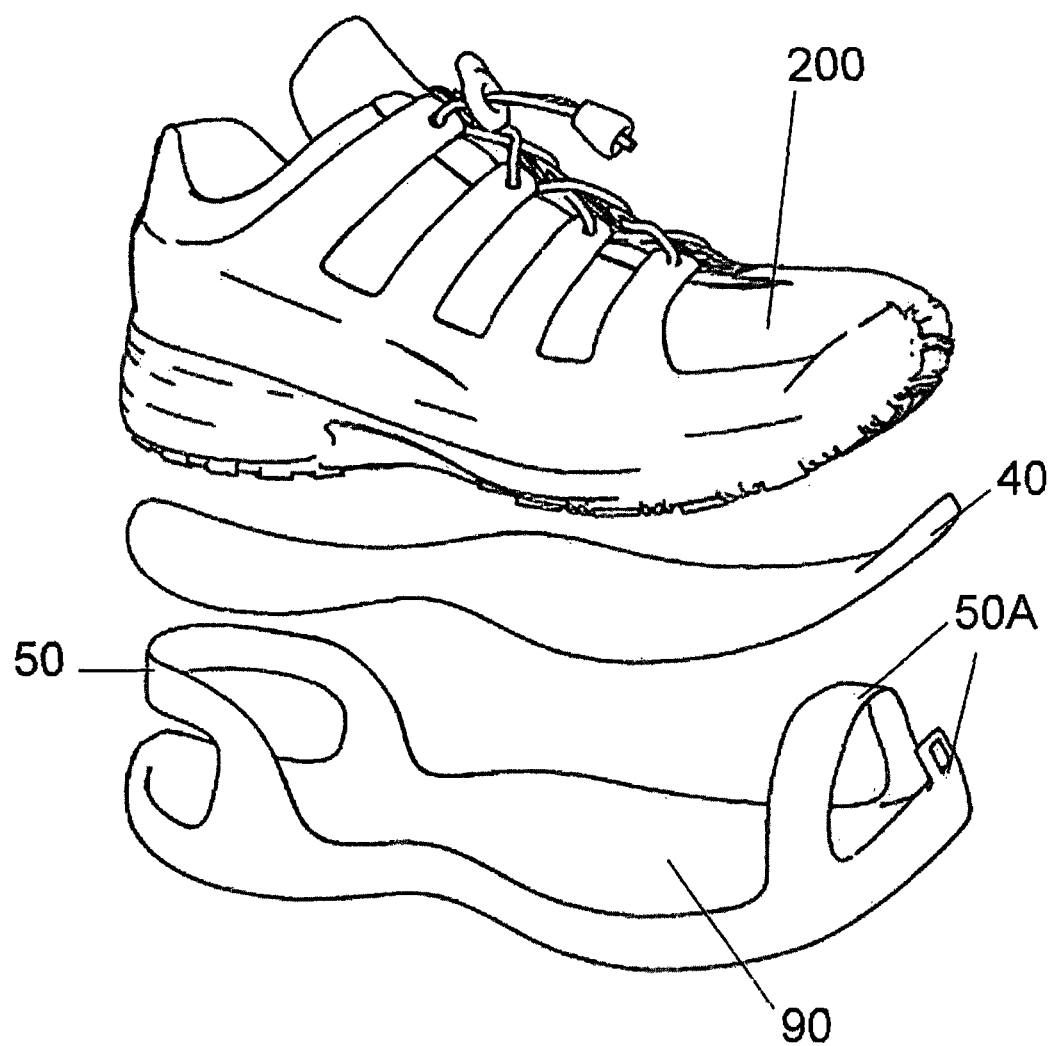
FIG. 5 shows a layer of grass arranged on a lower face of an item of footwear with the sole is positioned for fitting to the footwear.

Referring to the Figures generally, FIGS. 1 to 5 show a first embodiment of the sole wherein the sole can be retrofitted to any item of footwear.

FIGS. 1 to 4 show the sole 100 comprises a mesh 30 for fitting to a lower face of an item of footwear wherein the mesh 30 has a continuous wall 20 arranged around an edge of the mesh 30 so as to define a cavity for retaining the growth medium 40 and grass 45 on the footwear.

The sole 100 is shaped to the item of footwear 200 in order to cup the distal face of the footwear 200 where the growth medium and grass (not shown in FIGS. 1 to 4) are retained.

FIG. 1 shows a layer of growth medium 40 and grass 45 arranged over a distal face of the training shoe 200. The sole 100 is sized to correspond to the distal face of the shoe 200 so that it can retain the layer of growth medium 40 and grass 45 tightly to the shoe 200.

The sole 100 has a mesh 30 with large apertures 90 for receiving tufts of grass 40. The apertures 90 are sized so as to allow the grass to easily pass through the mesh 30.

The sole 100 has a plurality of attachment means 50. The attachment means comprise; two toe clips 50A, 50C and one heel clip 50B. 50C and 50B comprise bands which are passed over the user's toe region and around the user's heel region in order to secure the sole 100 to the shoe 200 and therefore retain the grass 45.

The bands 50 are elasticated so as to be stretched and held tightly over/about the footwear. The grass 45 may be grown in the sole 100.

Figure 6:
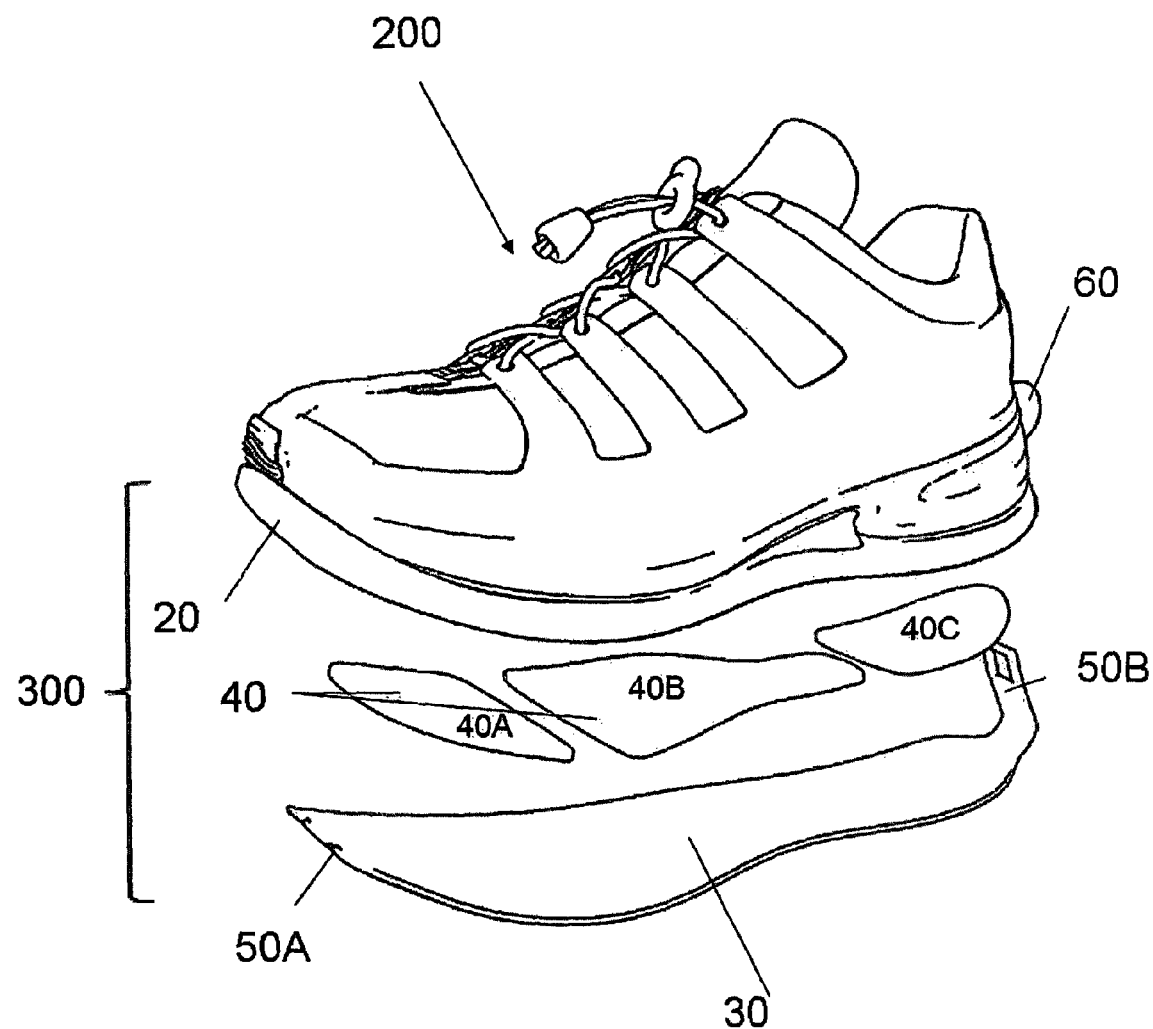
FIG. 6 shows an exploded view of a second embodiment of a training shoe and sole.
Figure 7:
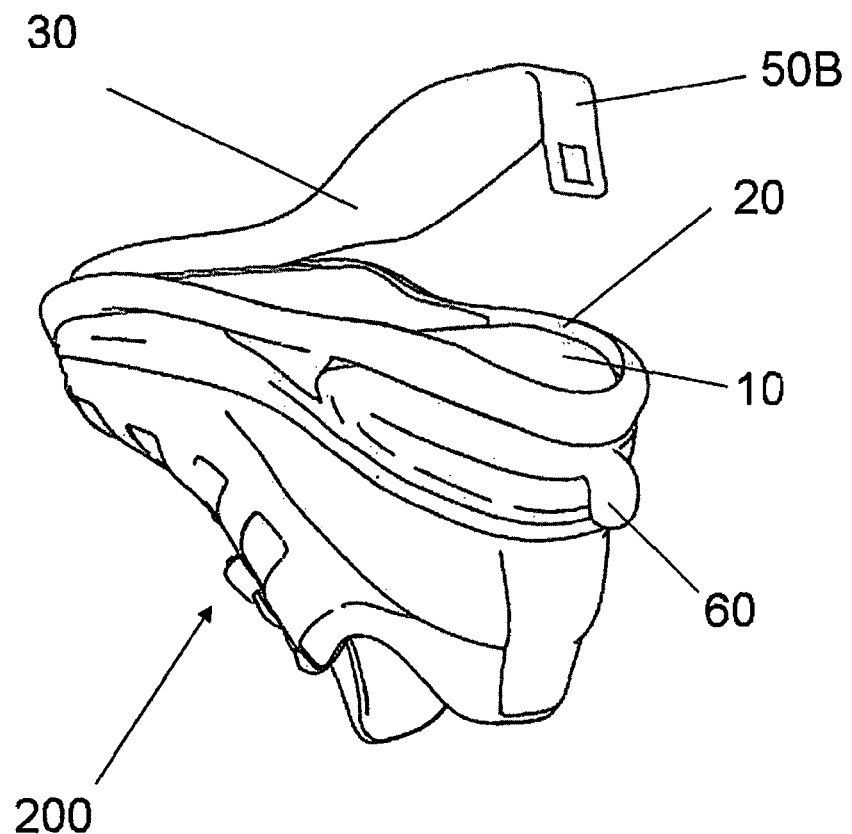
FIG. 7 shows an isometric view of the sole arranged on a shoe with the mesh partially displaced.
Figure 8:
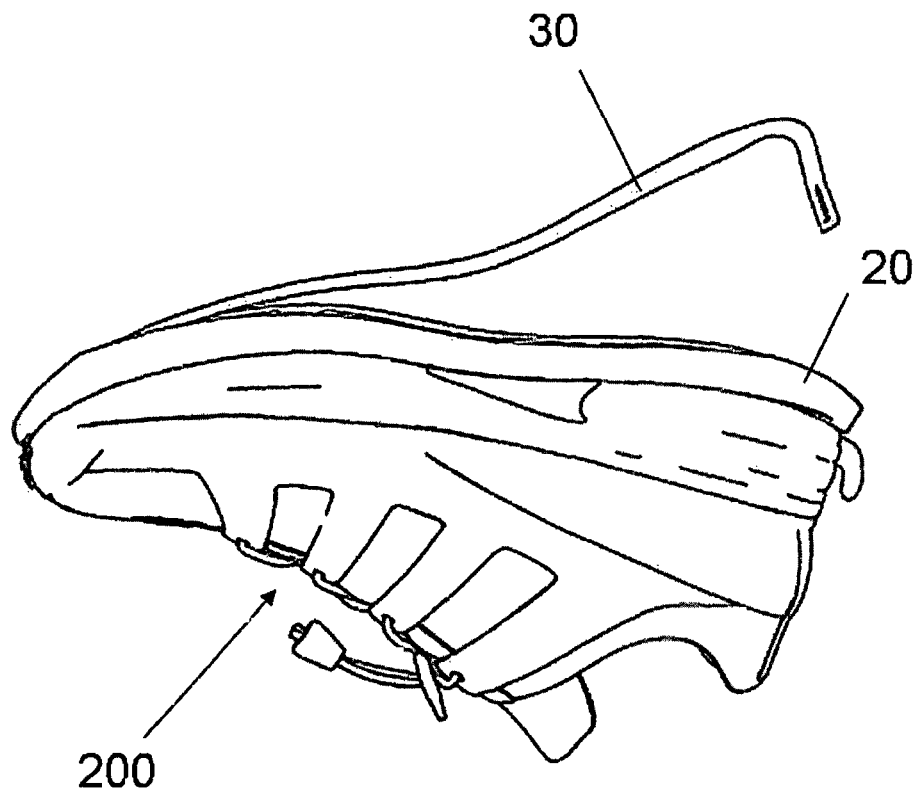
FIG. 8 shows a side view of the embodiment shown in FIG. 6.

Referring now to FIGS. 6 to 13, which show a second embodiment of the sole wherein the sole is integrated with a shoe. FIGS. 6 to 8 show a sole having a base 10 having a wall 20 arranged on the training shoe 200. The base 10 and wall 20 are formed as one part wherein a top surface of the base is attached to a distal face of the training shoe 200. The base 10 and wall 20 remain permanently fixed to the shoe being an integral part.

The wall 20 is arranged around an edge of the base 10 so as to define a cavity 80 in which the growth medium and grass 40 is received and retained in use. Grass is not shown in FIGS. 6 to 13.

The wall 20 is curved outwards so as to have a concave inner wall which defines the cavity sides.

The growth medium 40 is provided in three sections, a toe section 40A an instep section 40B and a heel section. The sections each correspond to parts of the cavity 80. The parts of the cavity 80 are divided by internal walls (not shown). Advantageously the sections 40A, 40B and 40C can be added and removed separately, therefore allowing each section to be exchanged when worn, without necessarily having to change all sections at once.

The mesh 30 has a toe clip 50A and a heel clip 50B for securing the mesh in position. The mesh 30 covers the cavity opening prevent escape of the growth medium 40 and grass 45 in use.

The mesh 30 is formed from a resiliently deformable material so as to enable movement when fixed to the shoe. The mesh 30 has a plurality of apertures 90 through which the grass 45 can project through so that it is the grass 45 that interfaces the ground in use. As the grass 45 becomes worn away during use the mesh 30 will be revealed and will become the surface interfacing the ground.

The toe clip 50A and heel clip 50B serve to attach the mesh to the base 10 within the confines of the wall 20.

The toe clip 50A is clipped to a toe region of the shoe so as to engage the mesh with the base. The mesh 30 can be pivoted from this point so as to displace the mesh 30 from the base 10 to gain access to the cavity(s) 80 without detaching the mesh from the base (as shown in FIGS. 7 and 8).

The training shoe 200 includes a tab 60 for receiving the heel clip 50B. The heel clip 50B has a hole for fitting about the tab in order to engage the heel clip 50B with the training shoe 200.

Figure 9:
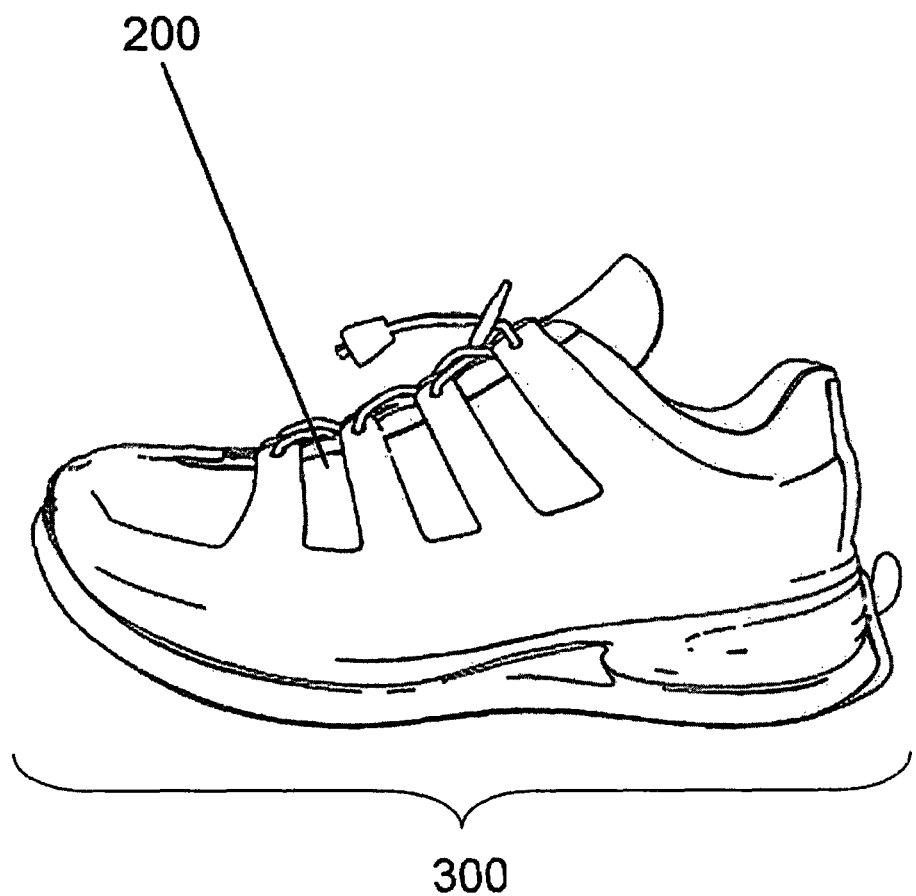
FIG. 9 shows an overall view of a training shoe with the sole of the present invention attached as shown in FIG. 6.

FIG. 9 shows a training shoe 200 with the sole 300 fitted. No grass is shown.

Figure 10:
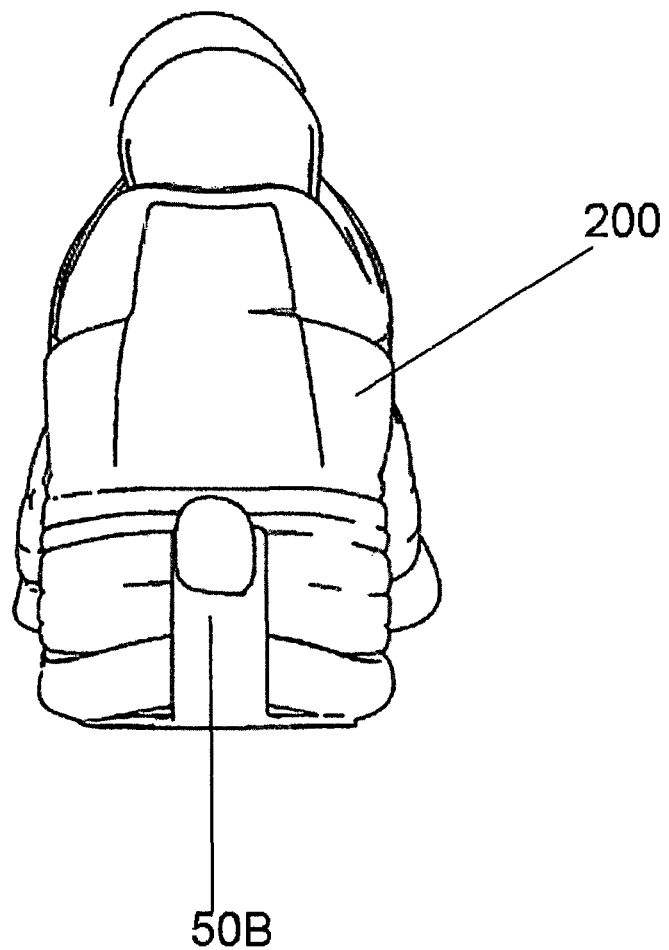
FIG. 10 shows a view rear view of a training shoe including the sole of the present invention as shown in FIG. 6.

FIG. 10 shows a rear view of the training shoe 200 with the heel clip 50B fixed to the tab 60 and thereby securing the sole to the shoe 200.

Figure 11:
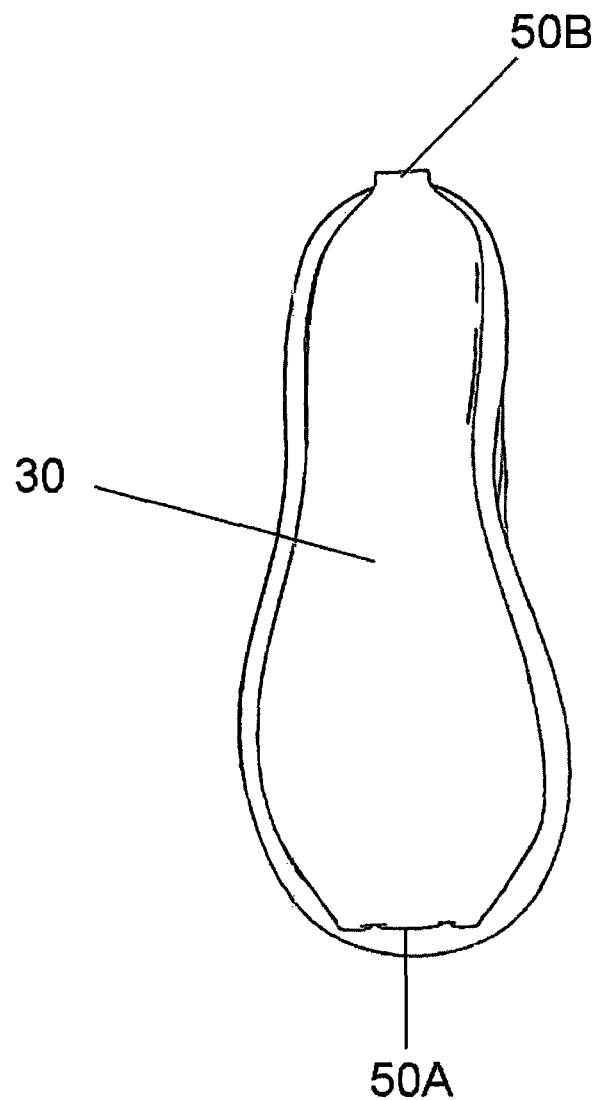
FIG. 11 shows an underside view of the sole shown in FIG. 6.

FIG. 11 shows an underside view of the sole 300 with the mesh 30 arranged to fit within the wall 20 thereby sealing the growth medium 40 and grass 45 within the cavity 80.

Figure 12:
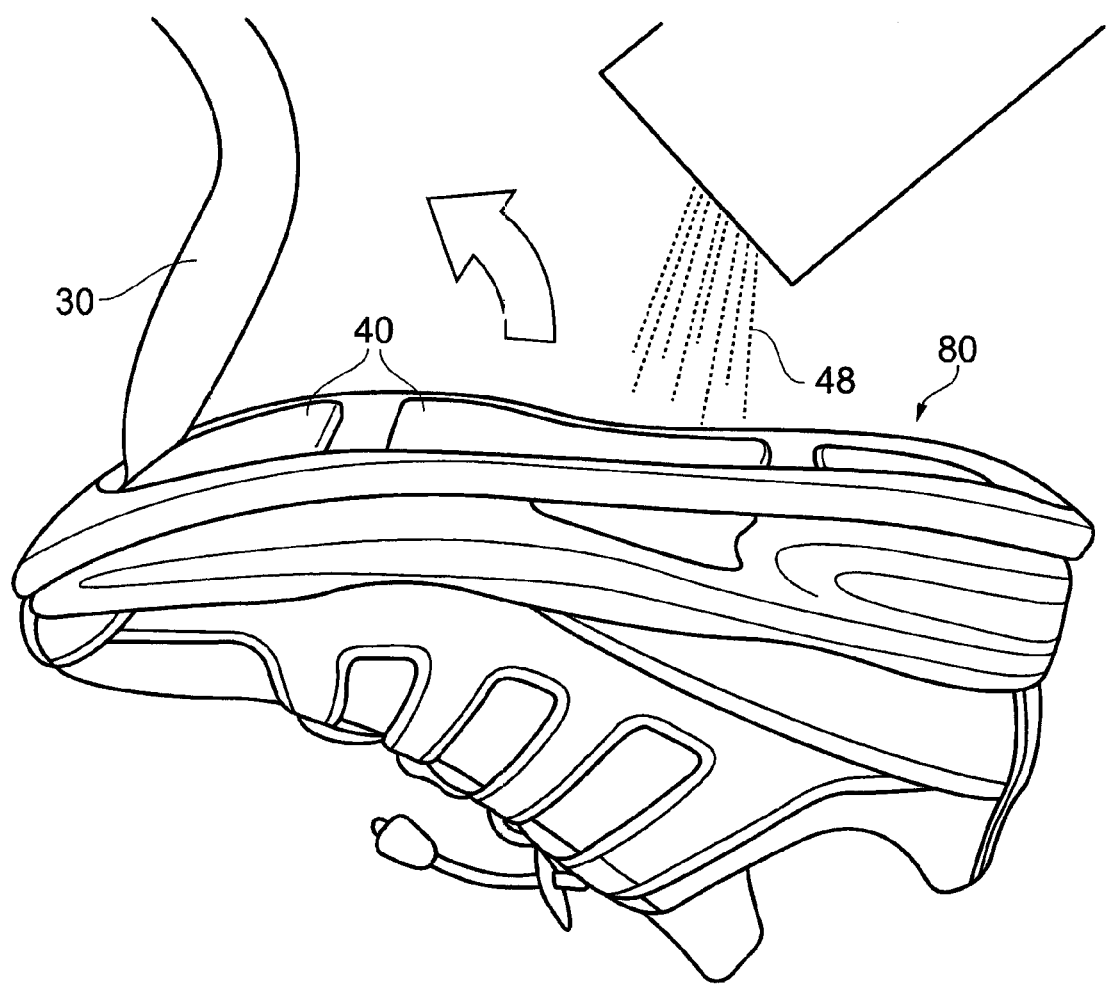
FIG. 12 shows grass seed being added to growth medium arranged in a cavity of the sole.
Figure 13:
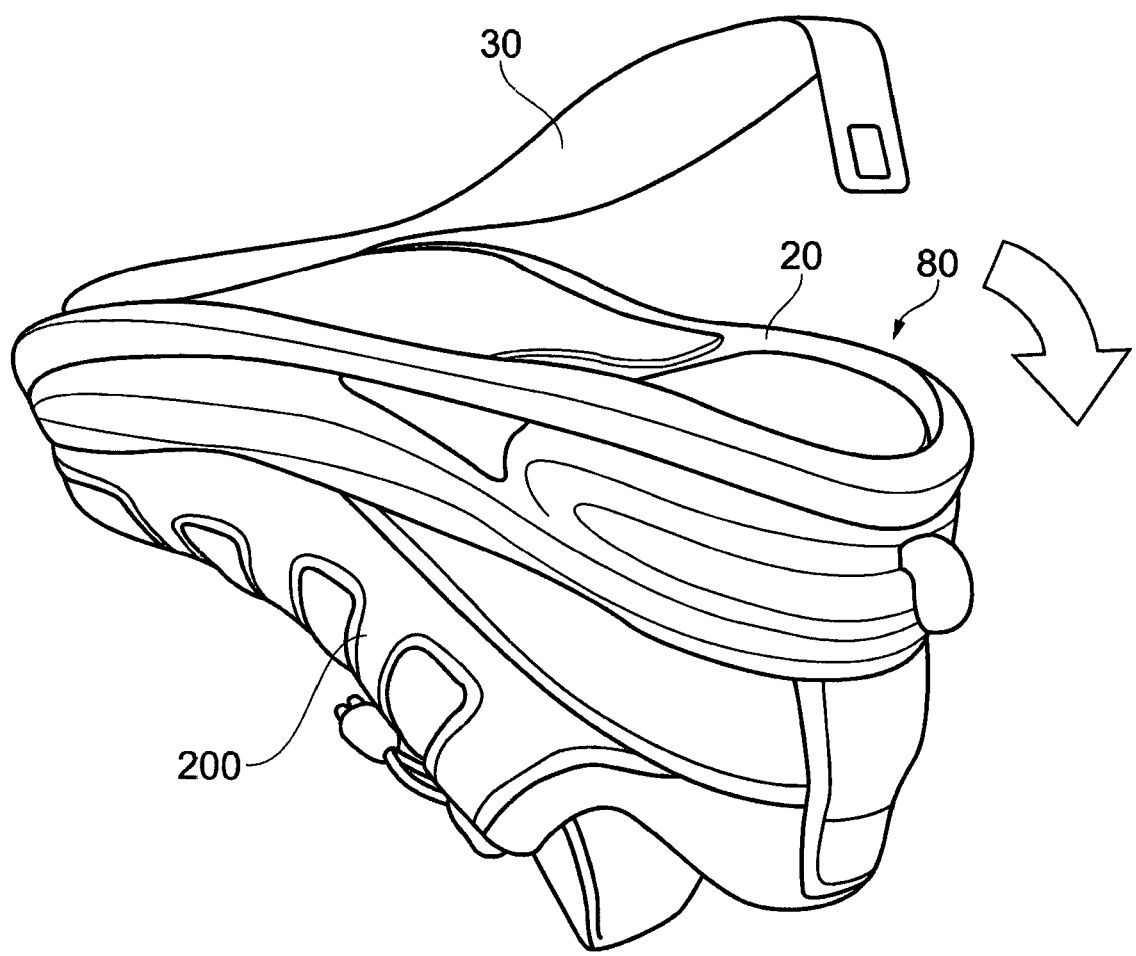
FIG. 13 shows the mesh being closed over growth medium impregnated with grass seed.

FIG. 12 shows grass seeds 48 being added to the growth medium arranged in the cavity 80. FIG. 13 shows the mesh 30 being closed over the impregnated growth medium 40 so that grass 45 is forced to grow through the mesh 30.

The invention has been described by way of examples only and it will be appreciated that variation may be made to the above-mentioned embodiments without departing from the scope of invention.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A sole, comprising:
   a growth medium layer comprising an impregnated growth medium impregnated with growing live grass; and
   a mesh adapted to retain the impregnated growth medium, and to be fitted to a lower face of an item of footwear,
   wherein the mesh forms a cavity between the mesh and the lower face of the item of footwear for housing the impregnated growth medium and preventing escape of the impregnated growth medium from the growth medium layer; and
   wherein when the mesh is fitted to the lower face of the item of footwear, roots of the growing live grass are held impregnated within the growth medium and blades of the growing live grass project from the growth medium layer through apertures in the mesh.

2. The sole according to claim 1, further comprising:
   attachment means for attaching the mesh to the item of footwear.

3. The sole according to claim 2, wherein the attachment means comprises:
   a toe clip on a front end of the mesh.

4. The sole according to claim 2, wherein the attachment means comprises:
   a heel clip on a rear end of the mesh.

5. The sole according to claim 1, wherein the mesh includes a continuous wall about an outer edge of the mesh so as to define the cavity for receiving the impregnated growth medium.

6. The sole according to claim 5, wherein the mesh further comprises:
   a base for attaching to the lower face of the footwear, the continuous wall extending distally from the base to define the cavity for retaining the impregnated growth medium layer.

7. The sole according to claim 6, wherein the base and the continuous wall are integrated.

8. The sole according to claim 1, wherein the mesh is detachable to enable access to the cavity for addition and removal of growth medium or grass seeds to the growth medium layer.

9. A sole according to claim 1, wherein the sole is formed of a resiliently deformable material so as to allow the sole to flex when the sole is fitted to the item of footwear and worn.

10. The sole according to claim 1, wherein the item of footwear is a shoe, and the sole is integrated with the shoe.

11. The sole according to claim 1, wherein grass impregnated in the impregnated growth medium is selected from the group comprising: Rye, Meadow and Fescue.

12. The sole according to claim 1, wherein the item of footwear is a shoe, and the sole is removably attachable to the shoe and is adapted to be retrofit to the shoe.

13. The sole according to claim 1, wherein the blades of grass extend through the mesh so as to act as a shock absorber for reducing impact to a wearer's joints.

14. A shoe including a sole according to claim 1.

15. The sole according to claim 1, wherein the impregnated growth medium comprises:
   a plurality of sections adapted to be added and removed separately from the cavity formed by the mesh, without having to change all of the plurality of sections at once.

16. The sole according to claim 1, wherein the mesh includes resiliently deformable projections in a generally downward orientation in use so as to provide improved support to the blades of the growing live grass.

17. The sole according to claim 1, wherein the cavity has a depth that varies width wise across the sole to thereby contain differing depths of the impregnated growth medium impregnated with growing live grass, to aid in correction of pronation.

18. The sole according to claim 1, wherein the sole includes transparent or translucent sections to enable light to reach the growing live grass.

* * * * *